(12) United States Patent
Kwon et al.

(10) Patent No.: US 7,248,443 B2
(45) Date of Patent: Jul. 24, 2007

(54) METHOD AND APPARATUS FOR A MEMS MICRO-ACTUATOR ASSEMBLY IN A HARD DISK DRIVE

(75) Inventors: Haesung Kwon, San Jose, CA (US); Hyung Jai Lee, San Jose, CA (US)

(73) Assignee: Samsung Electronics Co., Ltd., Suwon, Kyungki-Do (KR)

(*) Notice: Subject to any disclaimer, the term of this patent is extended or adjusted under 35 U.S.C. 154(b) by 422 days.

(21) Appl. No.: 10/986,345

(22) Filed: Nov. 10, 2004

(65) Prior Publication Data
US 2006/0098346 A1    May 11, 2006

(51) Int. Cl.
*G11B 5/56* (2006.01)
(52) U.S. Cl. .................................. 360/294.3
(58) Field of Classification Search ............. 360/294.3, 360/294.6, 294.7
See application file for complete search history.

(56) References Cited

U.S. PATENT DOCUMENTS

| | | | | |
|---|---|---|---|---|
| 6,507,463 B1 * | 1/2003 | Boutaghou | ............... | 360/294.3 |
| 6,731,471 B1 * | 5/2004 | Bonin | ...................... | 360/294.3 |
| 6,853,517 B2 * | 2/2005 | Hirano et al. | ............ | 360/294.3 |
| 2004/0160702 A1 * | 8/2004 | Hirano et al. | ............ | 360/294.3 |

OTHER PUBLICATIONS

Francis Tay E.H et al.; Electrostaic Spring Effect on the Dynamic Performance of Microresonators; 4 pages; National University of Singapore, Dept of Merchanical and Production Engineering, Singapore.

Nguyen, Hung, et all; A Novel MEMS Tunable Capacitor Based on Angular Vertical Comb Drive Actuators;4 pages; University of Los Angeles, Department of Electrical Engineering; Los Angeles, USA.
Liu, Chang; Bar-Cohen, Y.; Scaling Laws of Microactuators and Potential Applications of Electroactive Polymers in MEMS; Proceedings of SPIE's Annual International Symposium on Smart Structures and Materials; Mar. 1-5, 1999, Paper No. 3669-33; SPIE; Newport Beach, CA.
Takeshi, Morita, et al.; A Smooth Impact Rotation Motor Using a Multi-Layered Torsional Piezoelectric Actuator; IEEE Transactions on Ultrasonics, Ferroelectrics, and Frequency Control, Nov. 1999, vol. 46, No. 6; IEEE Utrasonics, Ferroelectrics and Frequency Control Society, Canada.
Tang, William; MEMS Resonators for Communication and Signal Processing Applications; slide presentation, Department of Biomedical Engineering; Univerity of California, Sep. 2003, USA.

* cited by examiner

*Primary Examiner*—David Davis
(74) *Attorney, Agent, or Firm*—Earle Jennings; GSS Law Group

(57) ABSTRACT

A micro-actuator assembly, which includes a first micro-actuator. The first micro-actuator includes: Two pivot spring pairs coupling to first stator and second stator. Two flexure spring pairs and pitch spring pair coupling to central movable section, which includes signal pair paths coupling to read-write head of a slider. The central movable section positions read-write head and conducts read-write head signaling. First micro-actuator electrical stimulus is through some of its springs. Micro-actuator assembly may include second micro-actuator with third stator and fourth stator interacting with central movable section. The second micro-actuator may also provide motion sensing, possibly indicating collision with the rotating disk surface being accessed. The invention includes head gimbal assemblies, actuator arms, actuator assemblies, voice coil assemblies and hard disk drives containing various embodiments of these micro-actuator assemblies.

20 Claims, 12 Drawing Sheets

METHOD AND APPARATUS FOR A MEMS MICRO-ACTUATOR ASSEMBLY IN A HARD DISK DRIVE

TECHNICAL FIELD

The invention relates to a micro-actuator assembly for positioning a slider over a rotating disk surface within a hard disk drive.

BACKGROUND OF THE INVENTION

Modem disk drives include a servo-controller driving a voice coil actuator to position a read-write head near a track on a rotating disk surface. The read-write head communicates with the servo-controller, providing feedback, which is used in controlling the read-write head's positioning near the track. The read-write head is embedded in a slider, which floats on a thin air bearing a very short distance above the rotating disk surface.

The voice coil actuator traditionally positioned the slider and its read-write head over the rotating disk surface. A voice coil actuator typically includes a voice coil, which swings at least one actuator arm in response to the servo-controller. Each actuator arm includes at least one head gimbal assembly typically containing a read-write head embedded in a slider. The head gimbal assembly couples to the actuator arm in the voice coil actuator.

A hard disk drive may have one or more disks. Each of the disks may have up to two disk surfaces in use. Each disk surface in use has an associated slider, with the necessary actuator arm. Hard disk drives typically have only one voice coil actuator.

Today, the bandwidth of the servo-controller feedback loop, or servo bandwidth, is typically in the range of 1.1K Herz. Greater servo bandwidth increases the sensitivity of the servo-controller to drive the voice coil actuator to finer track positioning. Additionally, greater servo bandwidth decreases the time for the voice coil actuator to change track positions. However, increasing servo bandwidth is difficult, and has not significantly improved in years. As a real densities increase, the need to improve track positioning increases.

One answer to this need involves integrating a micro-actuator into each head gimbal assembly. These micro-actuators are devices typically built of piezoelectric composite materials, often including lead, zirconium, and tungsten. The piezoelectric effect generates a mechanical action through the application of electric power. The piezoelectric effect of the micro-actuator, acting through a lever between the slider and the actuator arm, moves the read-write head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth.

Micro-actuation is today in its industrial infancy. What is needed are practical, reliable and cost effective mechanisms coupling a slider to a piezoelectric device to form a micro-actuator for use in hard disk drives. There is a problem with piezoelectric devices as micro-actuators, they are limited in how small they can become. At increasingly small scales of operation, the piezoelectric effect is not able to move sliders.

What is needed are nanoscale micro-actuators which can move sliders in the hard disk drives using electrostatic mechanisms.

BRIEF SUMMARY OF THE INVENTION

The invention includes a micro-actuator assembly for coupling a slider with a flexure on a load beam, including a first micro-actuator, which includes the following. A first pivot spring pair coupling to a first stator. A second pivot spring pair coupling to a second stator. A first flexure spring pair and a second flexure spring pair coupling to a central movable section. A pitch spring pair coupling to the central movable section. The central movable section includes signal pair paths coupling to the read differential signal pair and the write differential signal pair of the read-write head of the slider.

The first micro-actuator can provide lateral motion, which can be finely controlled to position the read-write head over a small number of tracks on a rotating disk surface. This lateral motion is a first mechanical degree of freedom, which results from the first stator and the second stator electrostatically interacting with the central movable section. The first micro-actuator may act as a lateral comb drive or a transverse comb drive.

The central movable section not only positions the read-write head, but is the conduit for the read-write head signals. These properties of the central movable section permit the micro-actuator assembly to be smaller and lighter weight. The electrical stimulus of the first micro-actuator is provided through some of its springs.

The micro-actuator assembly may further include a second micro-actuator including a third stator and a fourth stator. Both third and fourth stators electostatically interact with the central movable section. These interactions urge the slider to move in a second mechanical degree of freedom, which can provide flying height control. The second micro-actuator may act as a vertical comb drive or a torsional drive. The second micro-actuator may also provide motion sensing, which may indicate collision with the rotating disk surface being accessed.

The micro-actuator assembly may be fabricated using a MicroElectroMechanical Systems (MEMS) approach, and may be considered a MEMS machine providing movement, electrical signal conduction, and possible motion sensing within the hard disk drive. The invention includes head gimbal assemblies, actuator arms, actuator assemblies, voice coil actuators and hard disk drives containing various embodiments of these micro-actuator assemblies.

DETAILED DESCRIPTION

Figure 1A:
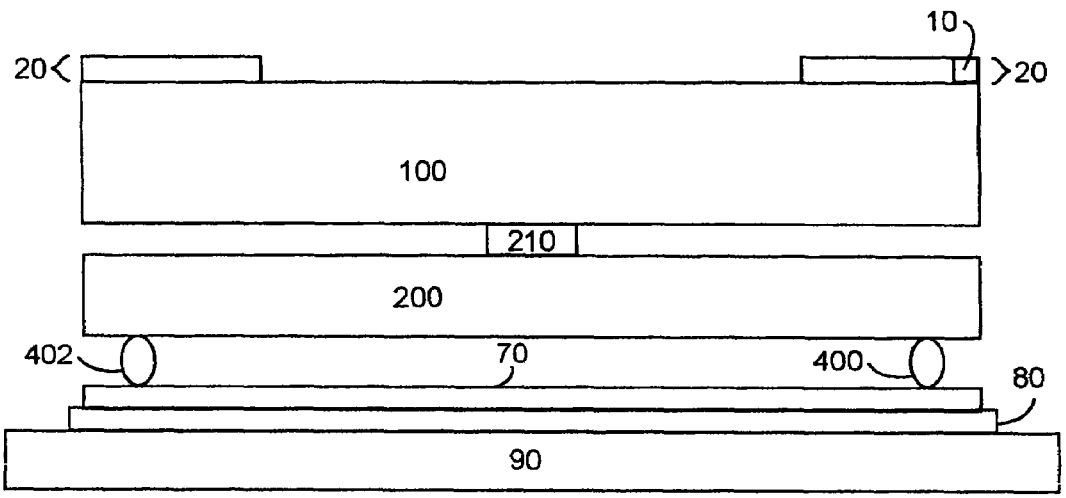
FIG. 1A shows the invention including a micro-actuator assembly for coupling a slider in a hard disk drive in accord with the invention.
Figure 1B:
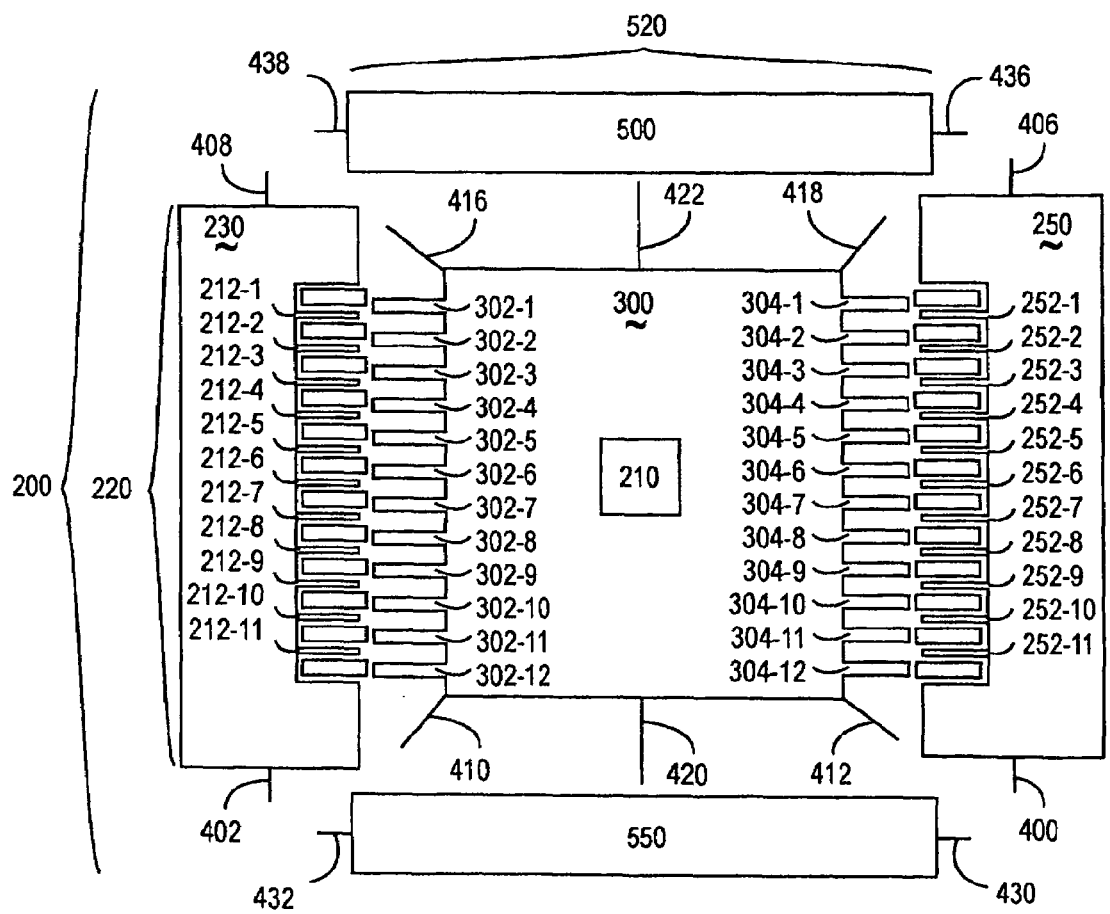
FIG. 1B shows the micro-actuator assembly of FIG. 1A including a first micro-actuator.
Figure 16:
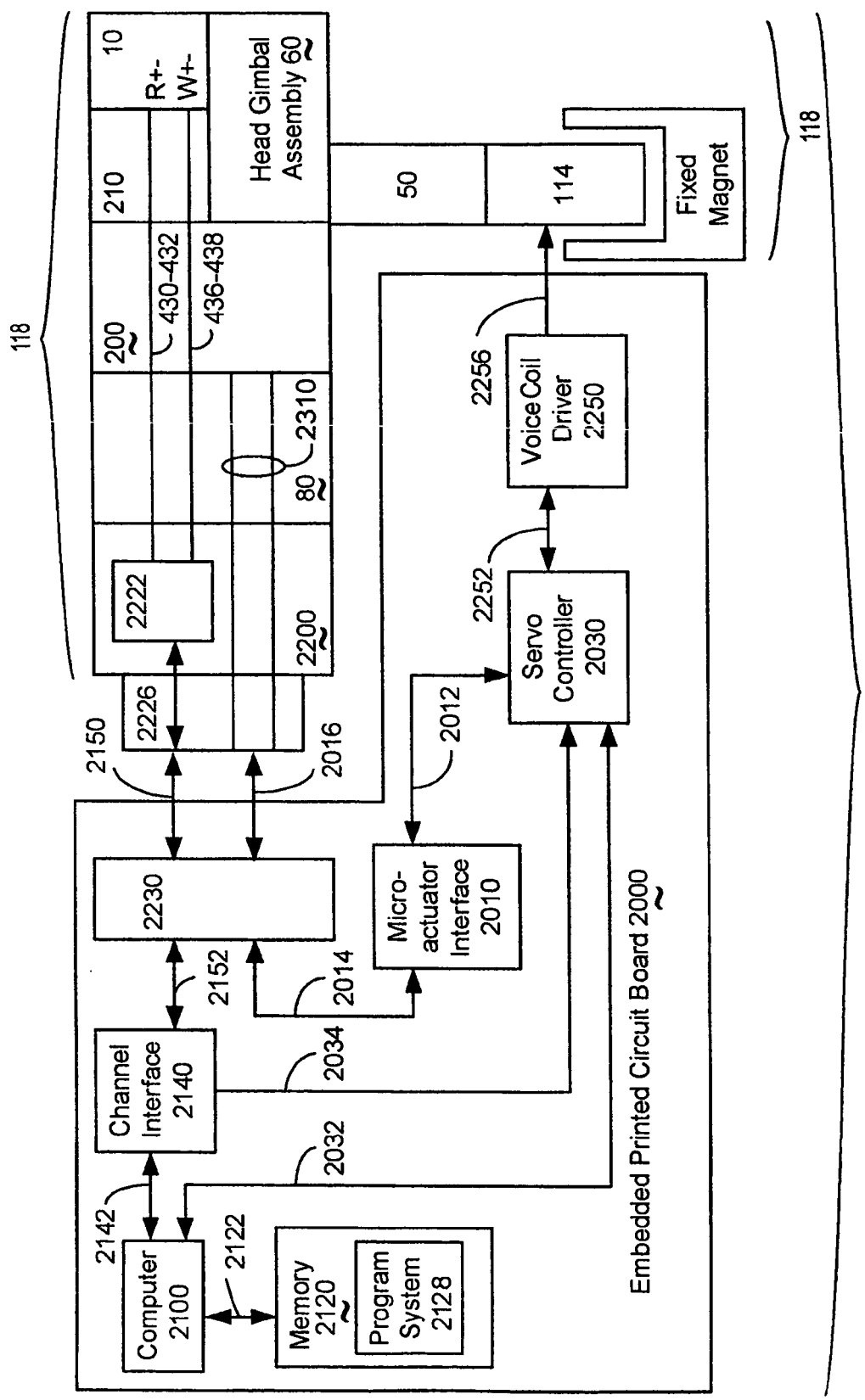
FIG. 16 shows an example of the electrical interactions within the hard disk drive, between the embedded printed circuit board of FIG. 14, the components of the voice coil actuator, and the micro-actuator assembly, in positioning and accessing the read-write head over a rotating disk surface as in FIG. 12B.

The invention includes a micro-actuator assembly 200 as shown in FIG. 1A for coupling a slider 100 with a flexure 80 on a load beam 90. The micro-actuator assembly 200 includes a first micro-actuator 220 as shown in FIG. 1B. The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the read differential signal pair R+– and the write differential signal pair W+– of the read-write head 10 of the slider 100 as shown in FIG. 16.

Figure 3:
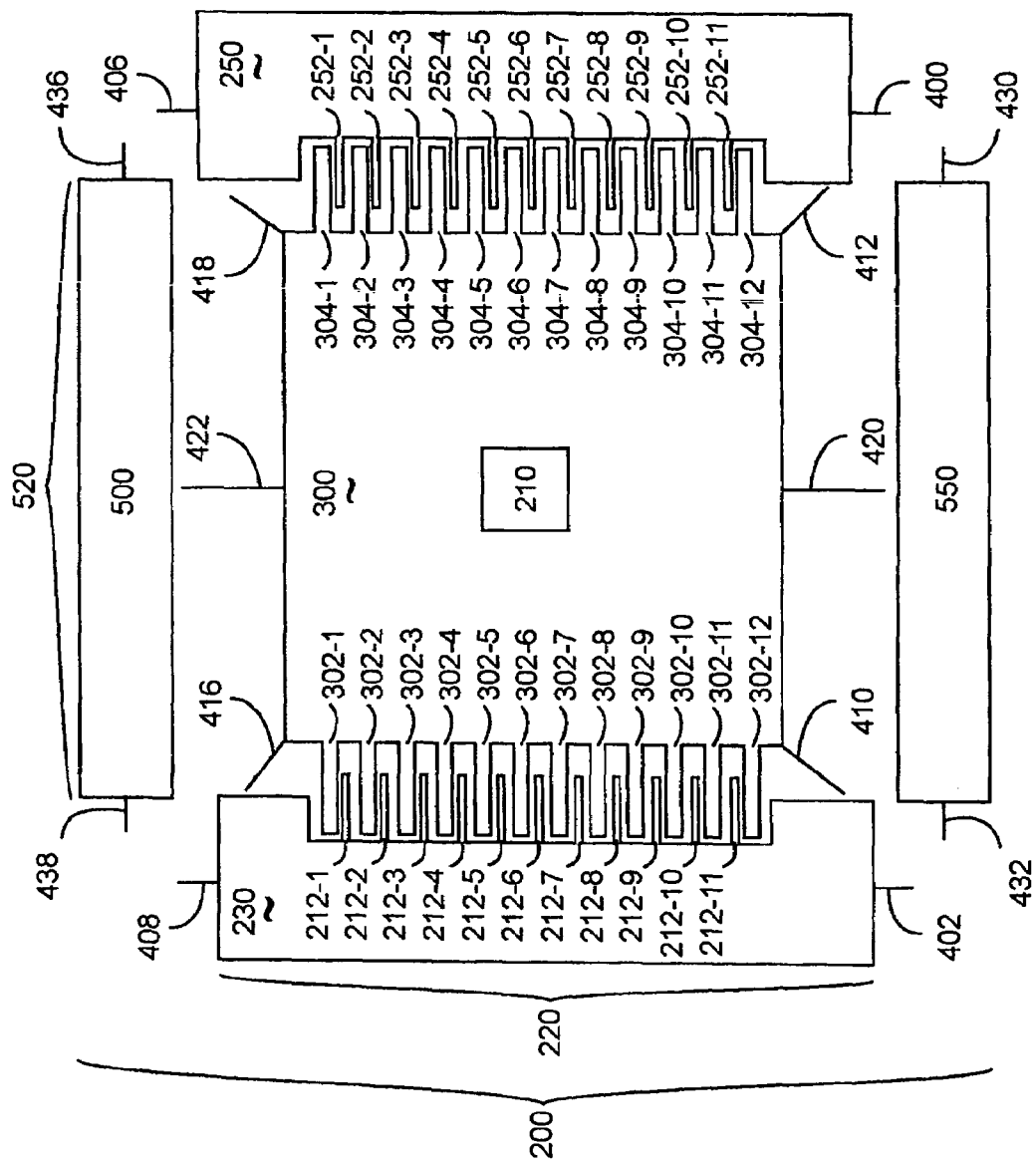
FIG. 3 shows the first micro-actuator of FIG. 1B as a lateral comb actuator.
Figure 4:
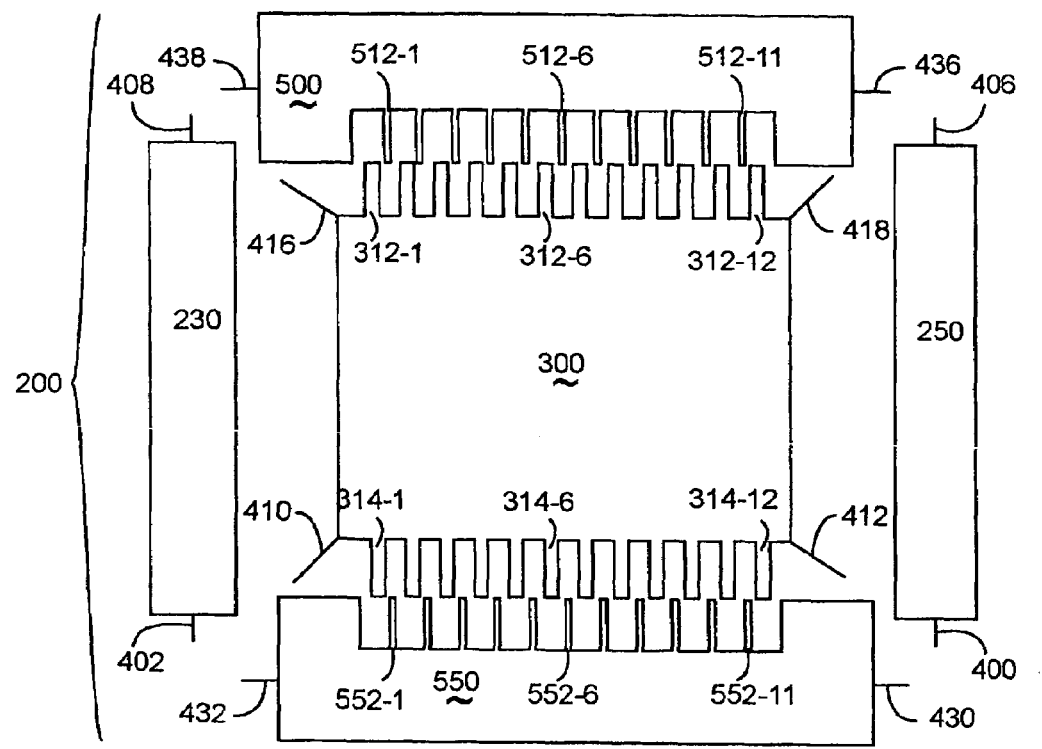
FIG. 4 shows the second micro-actuator of FIGS. 1A, 2, and 3, including the third stator, the central movable section, and the fourth stator forming a vertical comb drive.

The first micro-actuator 220 can provide lateral motion, which can be finely controlled to position the read-write head 10 over a small number of tracks on a rotating disk surface 180. This lateral motion is a first mechanical degree of freedom, which results from the first stator 230 and the second stator 250 electrostatically interacting with the central movable section 300. The first micro-actuator 220 may act as a lateral comb drive as shown in FIG. 3 or a transverse comb drive as shown in FIG. 4.

The central movable section 300 not only positions the read-write head 10, but is the conduit for the read-write head signals as shown in FIGS. 5, 7, 8 and 16. These properties of the central movable section 300 permit the micro-actuator assembly 200 to be smaller and lighter weight. The electrical stimulus of the first micro-actuator 220 is provided through some of its springs.

The micro-actuator assembly 200 may further include a second micro-actuator 520 including a third stator 500 and a fourth stator 550. Both third stator 500 and the fourth stator 550 electostatically interact with the central movable section 300. These interactions urge the slider 100 to move in a second mechanical degree of freedom, which can provide flying height control. The second micro-actuator 520 may act as a vertical comb drive as shown in FIG. 4 or a torsional naive. The second micro-actuator 520 may also provide motion sensing, which may indicate collision with the rotating disk surface 180 being accessed.

The micro-actuator assembly 200 may be fabricated using a MicroElectroMechanical Systems (MEMS) approach, and may be considered a MEMS machine providing movement, electrical signal conduction, and possible motion sensing within the hard disk drive 1000. The invention includes the head gimbal assembly 60, the actuator arm 50, the actuator assembly 158, the voice coil actuator 118 and the hard disk drive 1000, which contain various embodiments of the micro-actuator assembly 200.

FIG. 1B shows the micro-actuator assembly 200 of FIG. 1A including a first micro-actuator 220. The first micro-actuator 220 includes a first pivot spring pair 402 and 408 coupling to a first stator 230. The first pivot spring pair 402 and 408 includes a first pivot top spring 408 and a first pivot bottom spring 402. The first micro-actuator 220 includes a second pivot spring pair 400 and 406 coupling to a second stator 250. The second pivot spring pair 400 and 406 includes a second pivot top spring 406 and a second pivot bottom spring 400. The first micro-actuator 220 includes a first flexure spring pair 410 and 416 and a second flexure spring pair 412 and 418 coupling to a central movable section 300. The first flexure spring pair 410 and 416 includes a first flexure top spring 416 and a first flexure bottom spring 410. The second flexure spring pair 412 and 418 includes a second flexure top spring 418 and a second flexure bottom spring 412. A pitch spring pair 420-422 couples to the central movable section 300. The pitch spring pair 420-422 includes a pitch top spring 422 and a pitch bottom spring 420.

Figure 2:
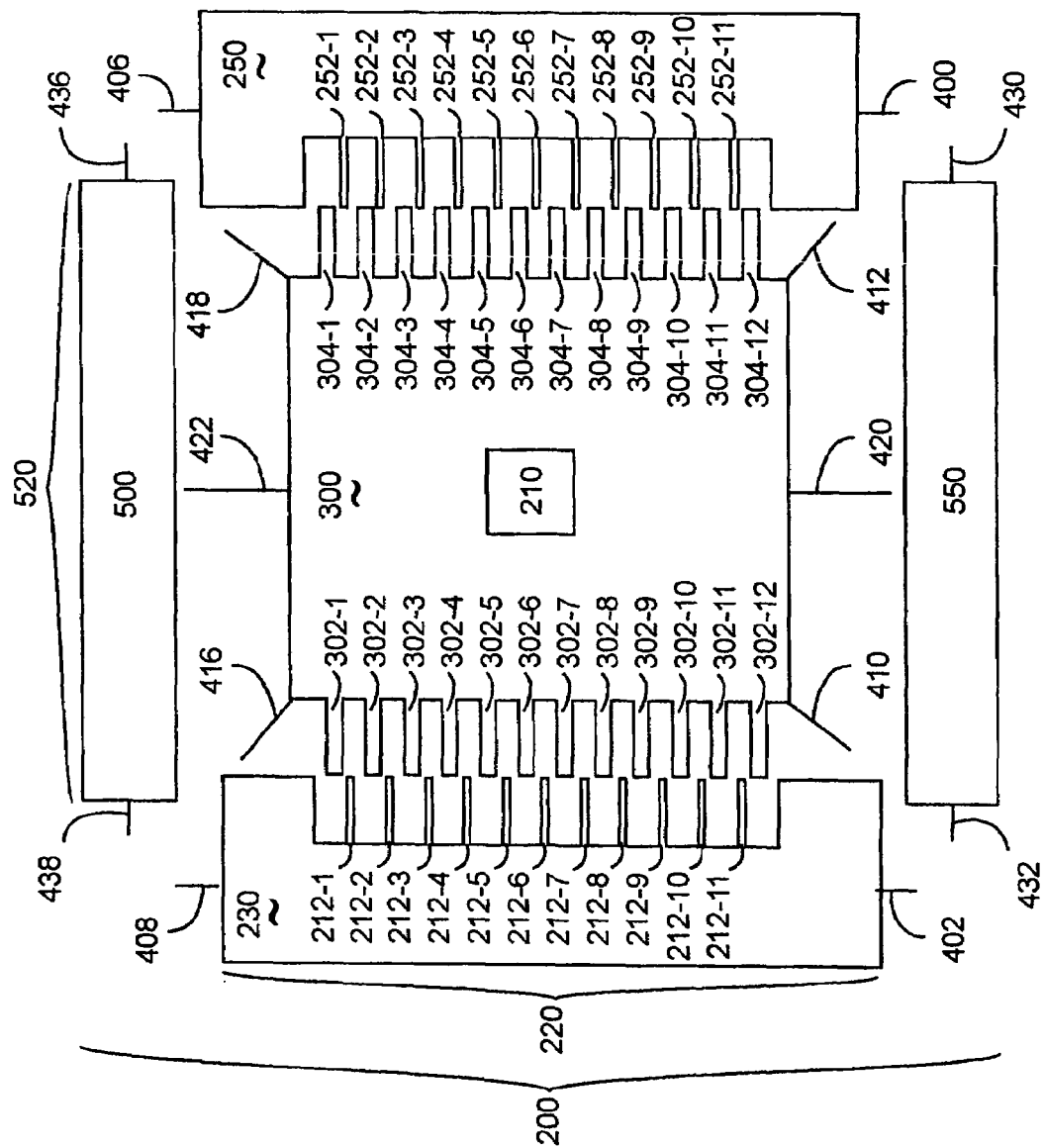
FIG. 2 shows the first micro-actuator of FIG. 1B as a transverse comb actuator.

FIG. 2 shows the first micro-actuator 220 of FIG. 1B as a transverse comb actuator, and FIG. 3 shows the first micro-actuator 220 of FIG. 1B as a lateral comb actuator. In FIGS. 1B, 2, and 3, the micro-actuator assembly 200 may further include a third stator 500 and a fourth stator 550, which electrostatically interact with the central movable section 300 to form a second micro-actuator 520.

FIG. 4 shows the second micro-actuator 520 of FIGS. 1B, 2, and 3, including the third stator 500, the central movable section 300, and the fourth stator 550 forming a vertical comb drive.

One skilled in the art will recognize that second micro-actuator 520 of FIGS. 1B, 2, and 3, including the third stator 500, the central movable section 300, and the fourth stator 550 may form a vertical torsional drive.

Figure 5:
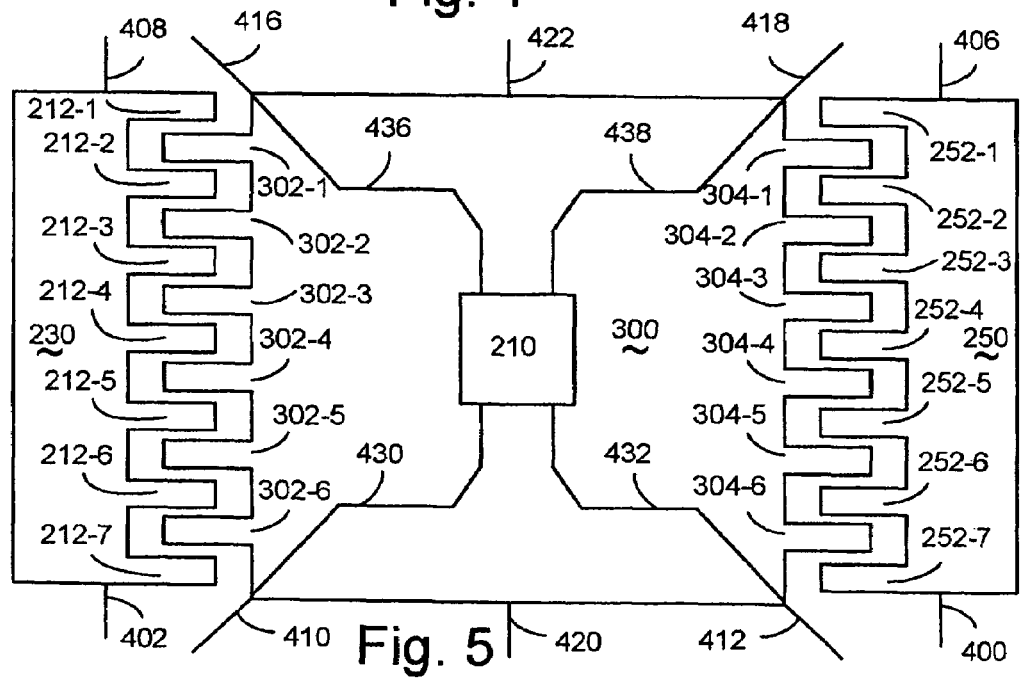
FIG. 5 shows the central movable section of FIGS. 1B, 2, 3 and 4 including a read-differential signal pair path and a write-differential signal pair path.

FIG. 5 shows the central movable section 300 of FIGS. 1B, 2, 3 and 4 including a read-differential signal pair path 430-432 and a write-differential signal pair path 436-438. The read-differential signal pair path 430-432 includes a first read-differential signal 430 and a second read-differential signal 432. The read-differential signal pair path 430-432 is used to provide a read differential signal pair R+− coupling to the slider 100 as in FIG. 16. The write-differential signal pair path 436-438 includes a first write-differential signal 436 and a second write-differential signal 438. The write-differential signal pair path 436-438 is used to provide a write differential signal pair W+− coupling to the slider 100.

The central movable section 300 is coupled to the flexure 80 and/or the load beam 90 as shown in FIG. 1A by the first flexure spring pair 410 and 416, the second flexure spring pair 412 and 418, and the pitch spring pair 420-422 as in FIGS. 1B to 5. These springs may preferably be made of a conductive, springy material. At least some of these springs are preferably used to provide the read-differential signal pair path 430-432 and the write-differential signal pair path 436-438 to the flexure 80. Stainless steel may be a preferred springy material in some embodiments.

The bonding block 210 of FIGS. 1A to 3, 5, 7 and 8 further preferably electrically couples the read-write head 10 of FIG. 1A to the read-differential signal pair path 430-432 and the write-differential signal pair path 436-438. The bonding block 210 mechanically couples the central movable section 300 to the slider 100, which the read-write head 10. The read-write head is embedded on or near the air bearing surface 20 included in the slider 100.

The first flexure spring pair 410 and 416 and the second flexure spring pair 412 and 418 may collectively couple to the read-differential signal pair path 430-432 and the write-differential signal pair path 436-438, as shown in FIG. 5. The invention includes all combinations of these springs coupling with these paths. In an alternative to FIG. 5, the first flexure spring pair 410 and 416 may couple to the read-differential signal pair path 430-432. The second flexure spring pair 412 and 418 may couple to the write-differential signal pair path 436-438.

Figure 6:
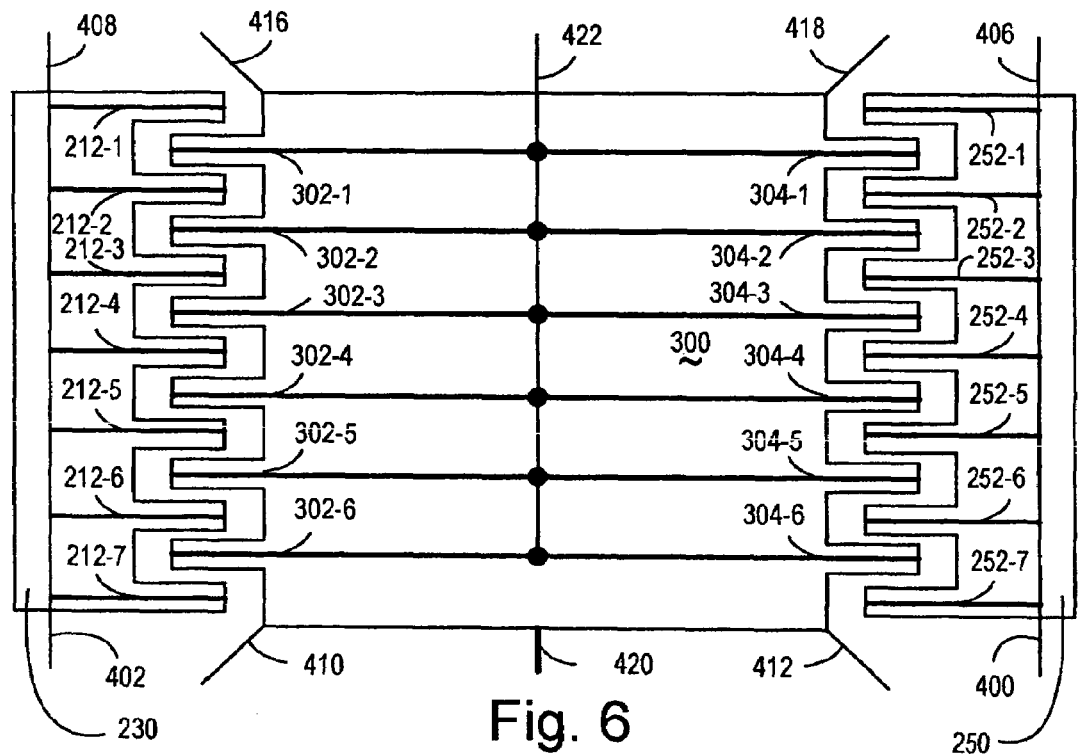
FIG. 6 shows at least one of the pitch springs of the pitch spring pair electrically coupled with a first finger array and also electrically coupled with a second finger array.

FIG. 6 shows at least one of the pitch springs of the pitch spring pair 420-422 electrically coupled with a first finger array 302-1-N1 and also electrically coupled with a second finger array 304-1-N2, where N1=N2=6. The first finger array 302-1-N1 includes 302-1, 302-2, 302-3, 302-4, 302-5, and 302-6. The first finger array 302-1-N1 of FIGS. 1B-3 has N1=12.

Figure 7:
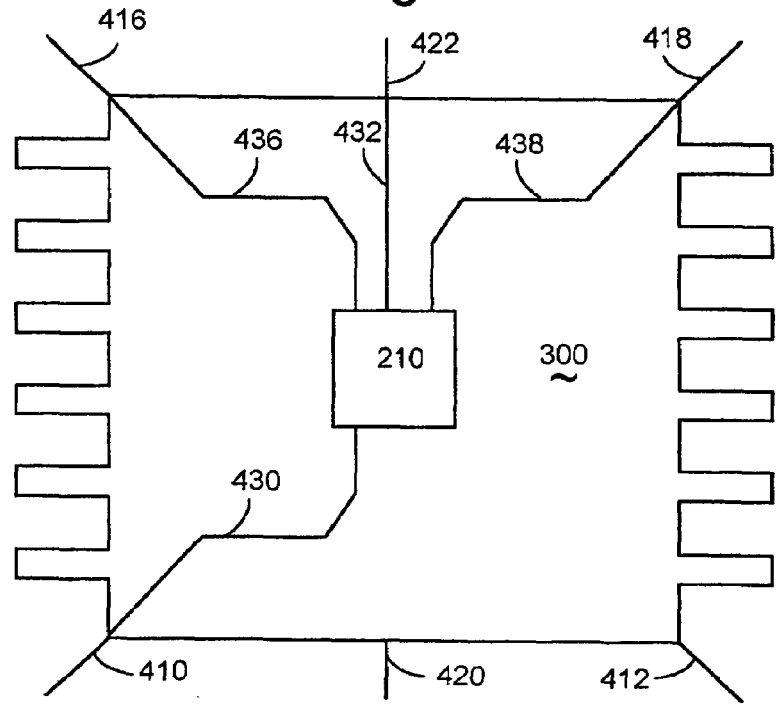
FIGS. 7 and 8 show some of the combinations of the pitch spring pair, the first flexure spring pair and the second flexure spring pair collectively coupling to the read-differential signal pair path and the write-differential signal pair path.
Figure 8:
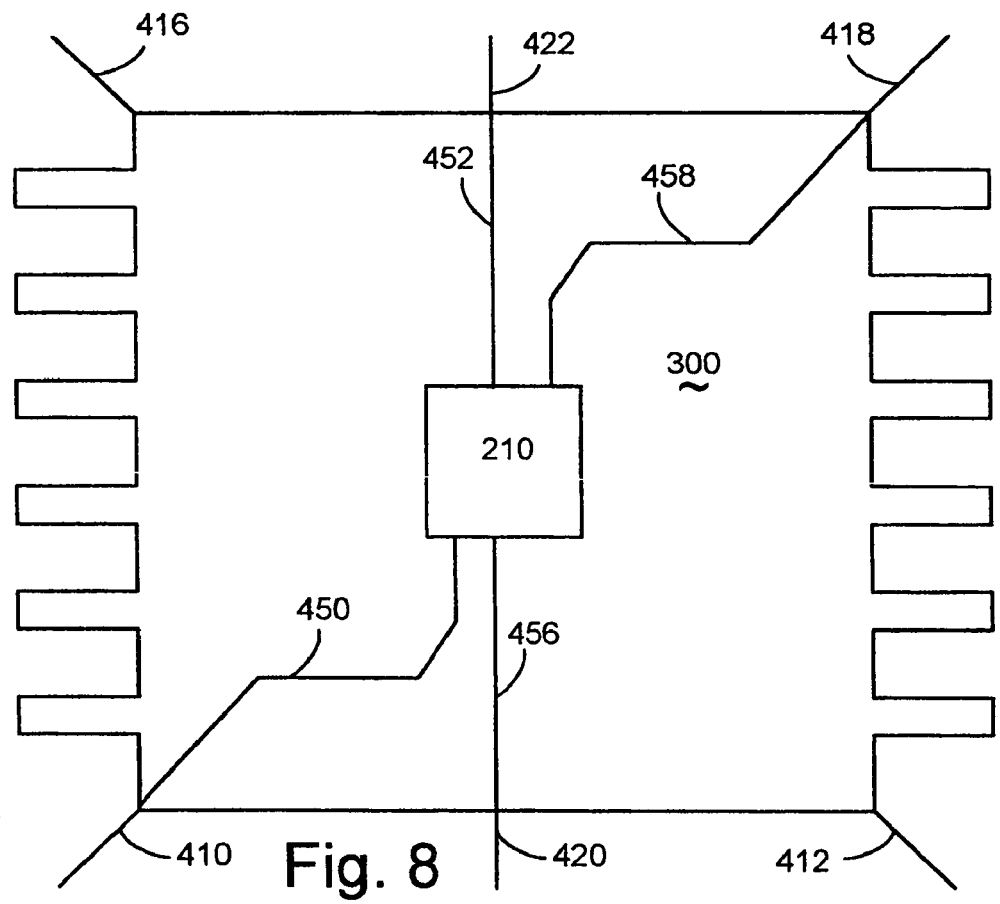

FIGS. 7 and 8 show some of the combinations of the pitch spring pair 420-422, the first flexure spring pair 410 and 416 and the second flexure spring pair 412 and 418 collectively coupling to the read-differential signal pair path 430-432 and the write-differential signal pair path 436-438. The invention includes all combinations of the 6 springs coupling to the central movable section 300 and providing the four distinct couplings required for the read-differential signal pair path 430-432 and the write-differential signal pair path 436-438.

Figure 9:
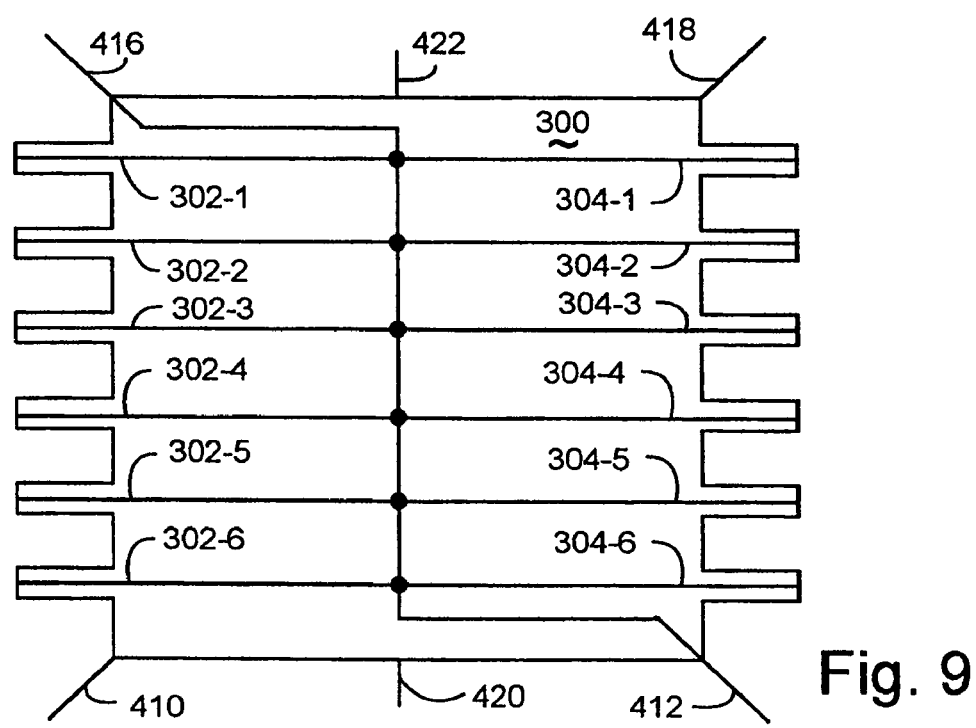
FIG. 9 shows the first flexure top spring and the second flexure bottom spring electrically coupled to the first finger array and to the second finger array.

FIG. 9 shows the first flexure top spring 416 and the second flexure bottom spring 412 electrically coupled to the first finger array 302-1-N1 and to the second finger array 304-1-N2. The invention also includes the first flexure bottom spring 410 and the second flexure top spring 418 electrically coupled to the first finger array 302-1-N1 and to the second finger array 304-1-N2.

Figure 10:
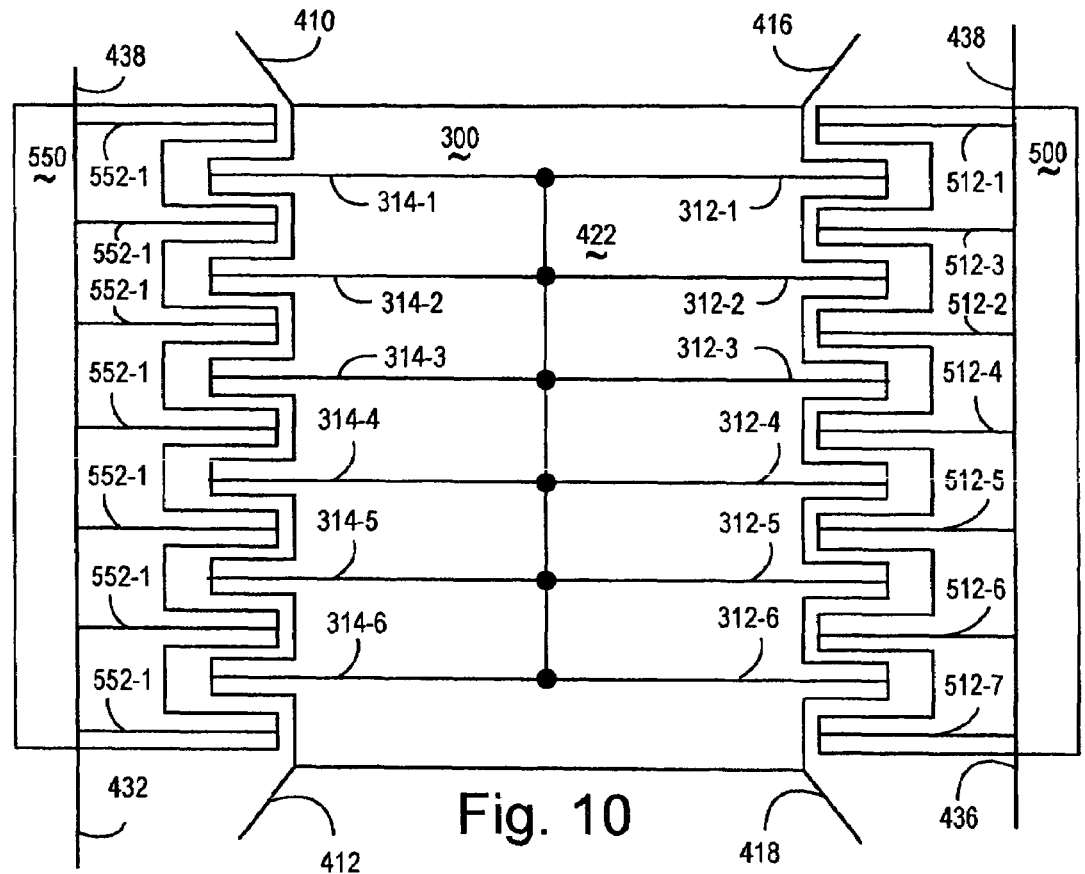
FIG. 10 shows at least one of the pitch spring pair electrically coupled with the third finger array and with the fourth finger array.

FIG. 10 shows at least one of the pitch spring pair 420-422 electrically coupled with the third finger array 312-1-N3 and with the fourth finger array 314-1-N4. The invention also includes embodiments where both the pitch top spring 422 and the pitch bottom spring 420 electrically couple with the third finger array 312-1-N3 and with the fourth finger array 314-1-N4.

Figure 11:
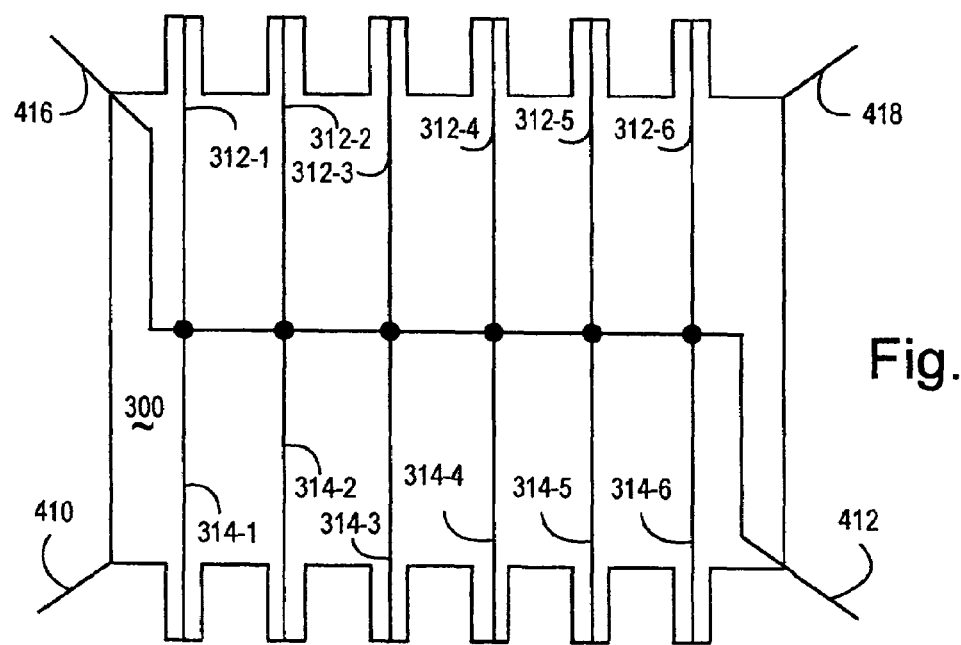
FIG. 11 shows the first flexure top spring and the second flexure bottom spring electrically coupled with the third finger array and with the fourth finger array.

FIG. 11 shows the first flexure top spring 416 and the second flexure bottom spring 412 electrically coupled with the third finger array 312-1-N3 and with the fourth finger array 314-1-N4. The invention also includes the first flexure bottom spring 410 and the second flexure top spring 418 electrically coupled with the third finger array 312-1-N3 and with the fourth finger array 314-1-N4.

Figure 12A:
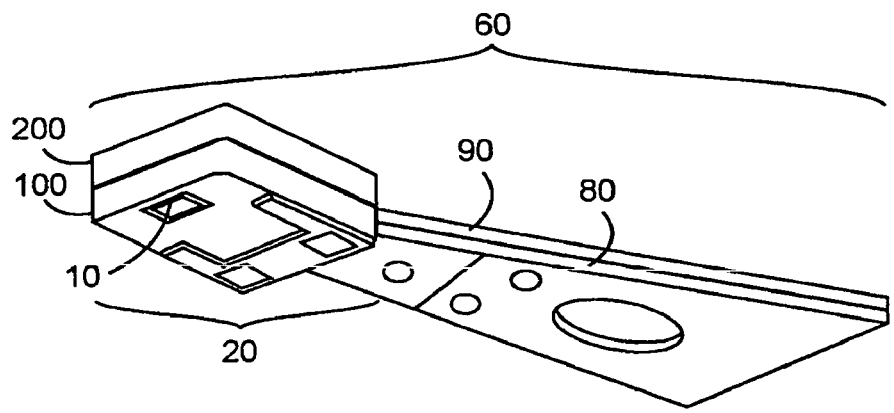
FIG. 12A shows a head gimbal assembly including the micro-actuator assembly of the preceding Figures, coupling the slider, the flexure, and the load beam, as well as providing electrical coupling to the read-write head.

FIG. 12A shows a head gimbal assembly 60 including the micro-actuator assembly 200 of the preceding Figures, coupling the slider 100, the flexure 80, and the load beam 90, as well as providing electrical coupling to the read-write head 10. The slider 100 includes the read-write head 10 embedded on the air bearing surface 20 of FIG. 1A.

Figure 12B:
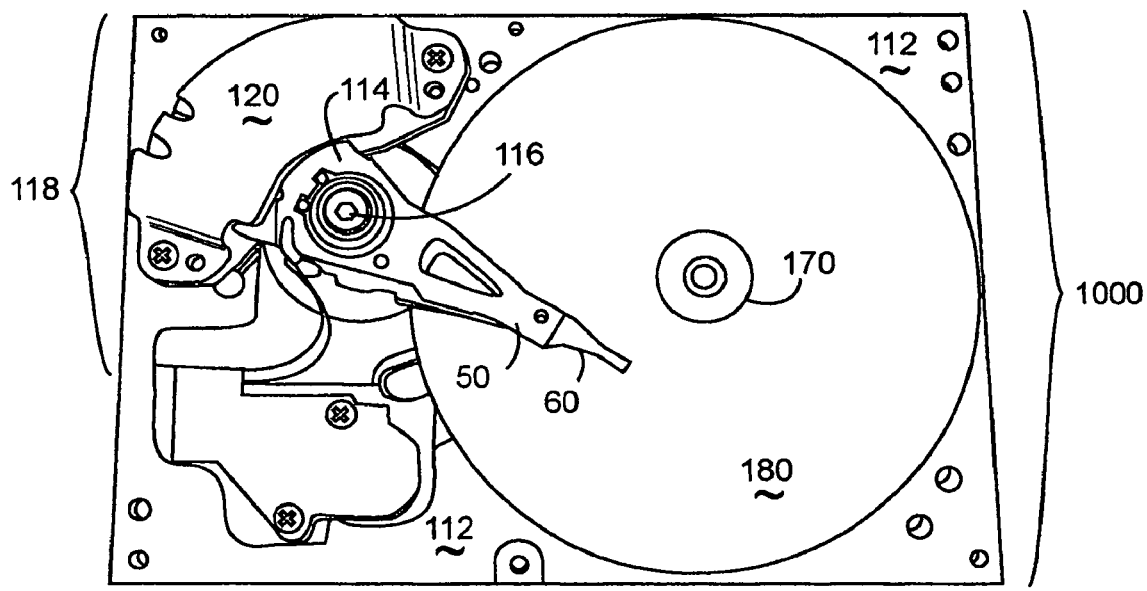
FIG. 12B shows a partially assembled hard disk drive including the head gimbal assembly of FIG. 12A coupled with an actuator arm, included in a voice coil actuator.

FIG. 12B shows a partially assembled hard disk drive 1000 including the head gimbal assembly 60 of FIG. 12A coupled with an actuator arm 50, included in a voice coil actuator 118.

Figure 13:
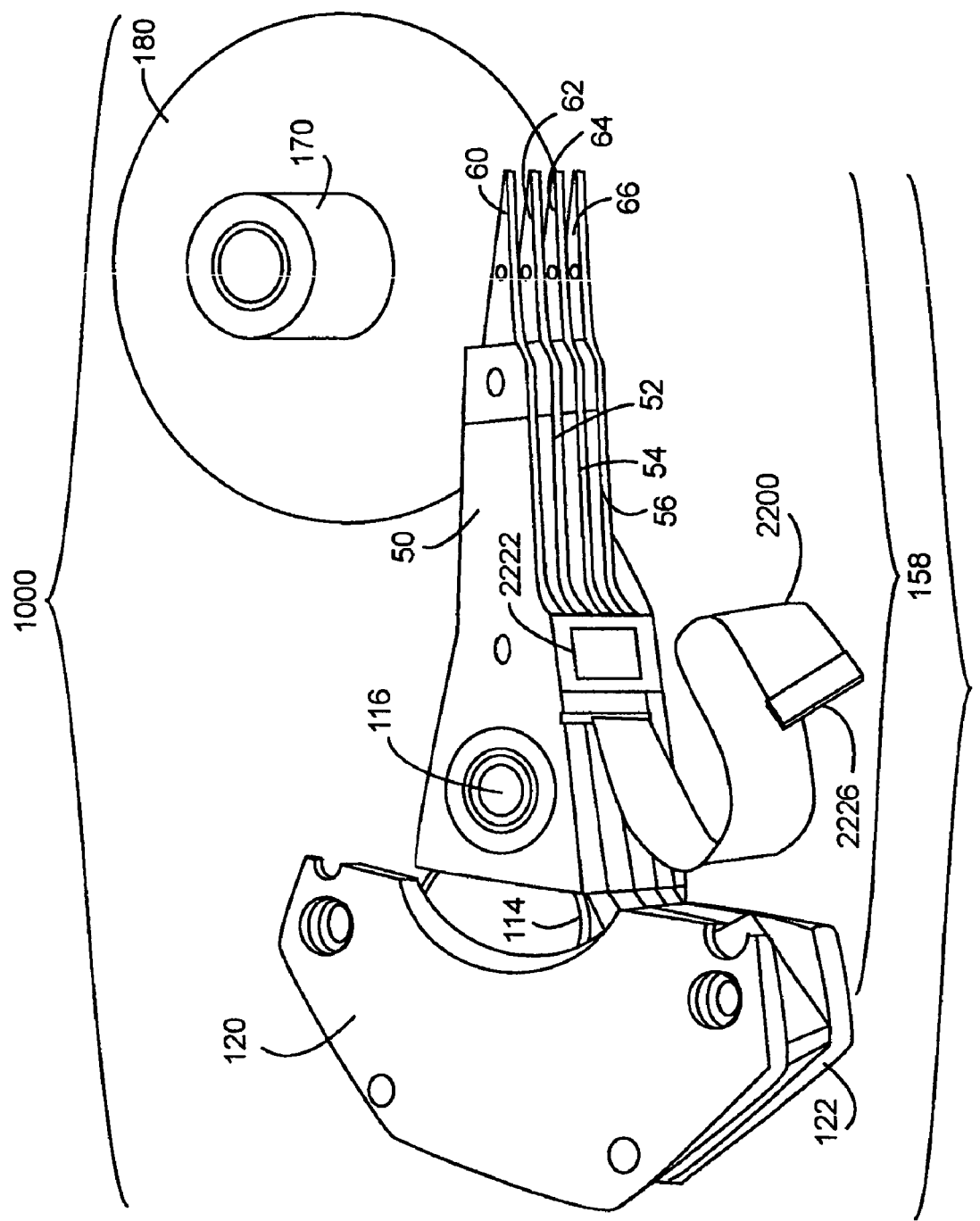
FIG. 13 shows the hard disk drive including the voice coil actuator of FIG. 12B, including an actuator assembly, which includes the head gimbal assembly of FIG. 12A.

FIG. 13 shows the hard disk drive 1000 including the voice coil actuator 118 of FIG. 12B, including an actuator assembly 158, which includes the head gimbal assembly 60 of FIG. 12A. The actuator arm 50 preferably includes the head gimbal assembly 60. The actuator assembly 158 preferably includes the actuator arm 50. The actuator assembly 158 is included in the voice coil actuator 118.

In FIG. 13, the voice coil actuator 118 is built with the flex circuitry 2200 coupled through at least one flexure 80 with the head gimbal assembly 60. The voice coil actuator 118 may include coupling more than one head gimbal assembly through more than one flexure cable. By way of example, the flex circuitry 2200 may couple through a second flexure with a second head gimbal assembly 62. The flex circuitry 2200 may couple through a third flexure with a third head gimbal assembly 64. The flex circuitry 2200 may couple through a fourth flexure with a fourth head gimbal assembly 66.

In FIG. 13, the actuator arm may include more than one head gimbal assembly. By way of example, the second actuator arm 52 may preferably include the second head gimbal assembly 62 and the third head gimbal assembly 64. Such an actuator arm may be preferred to minimize manufacturing expense. The second actuator arm 52 preferably accesses two rotating disk surfaces (which are not shown) and may further improve the overall reliability of the hard disk drive 1000.

In FIGS. 12B and 13, the hard disk drive 1000 is shown built with the voice coil actuator 118. The voice coil actuator 118 includes an assembly of at least one actuator arm 50, and as shown, may include additional actuator arms 52, 54 and 56. A disk surface is shown, which when the invention is in operation, rotates about spindle 170 to create the rotating disk surface 180.

In FIG. 12B, the actuator assembly 158 pivots about the actuator pivot 116. The actuator assembly 158 includes the actuator arm 50 coupled with the voice coil 114. When the voice coil 114 is electrically stimulated with a time-varying electrical signal, it inductively interacts with a fixed magnet attached to the voice coil yoke 120, causing the actuator arm 50 to pivot by lever action through the actuator pivot 116. Typically, the fixed magnet is composed of two parts, one attached to the voice coil yoke 120 and the other attached to the bottom voice coil yoke 122. As the actuator arm 50 pivots, the head gimbal assembly 60 is moved across the rotating disk surface 180. This provides the coarse positioning of the slider 100, and consequently, the read-write head 10 over a specific track.

Figure 14:
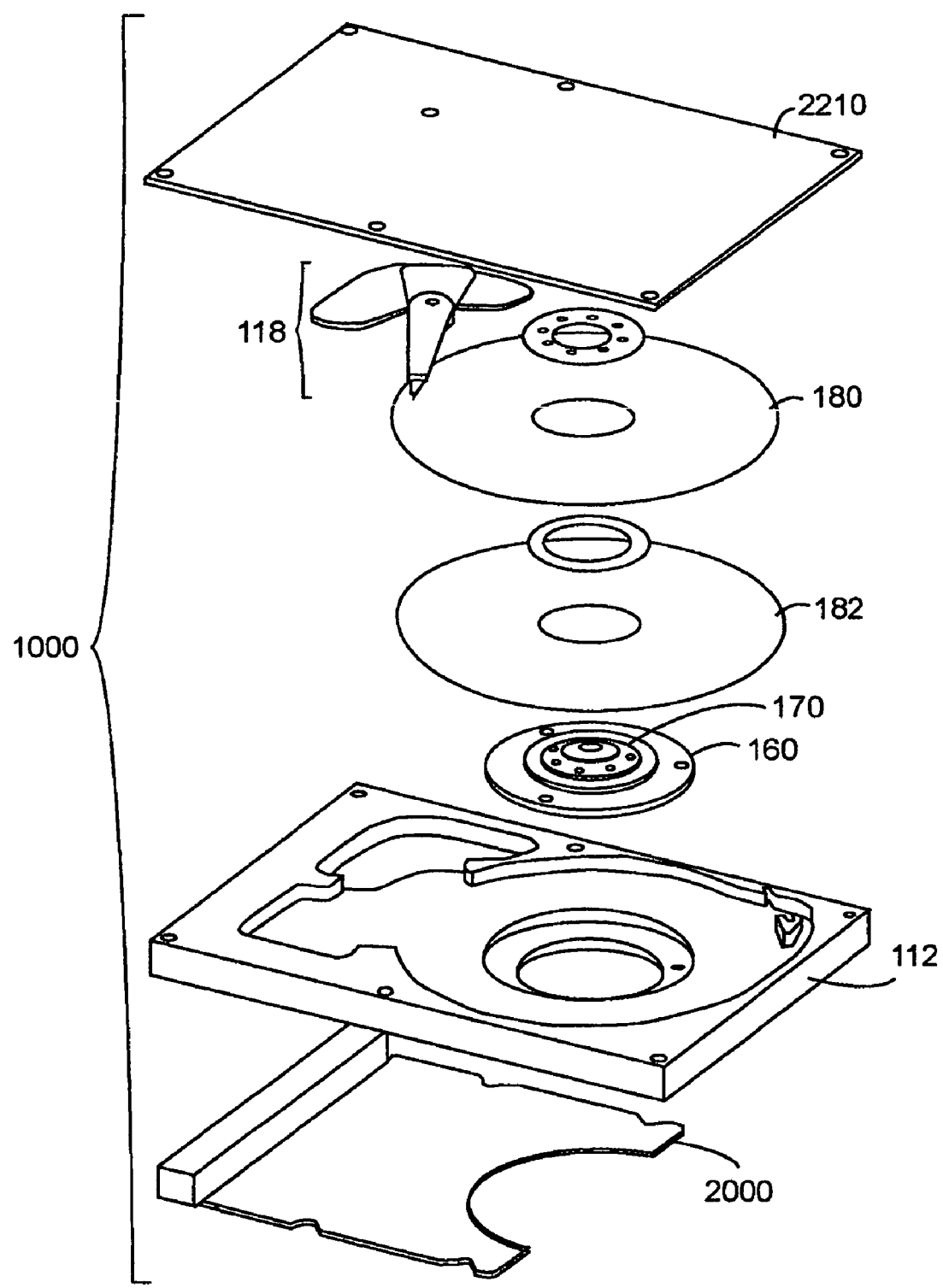
FIG. 14 shows an exploded view of the primary components of the hard disk drive of FIGS. 12B and 13 including the voice coil actuator.

FIG. 14 shows an exploded view of the primary components of the hard disk drive 1000 of FIGS. 12B and 13 including the voice coil actuator 118. The hard disk drive 1000 further includes a disk base 112 to which the voice coil actuator 118 is preferably mounted, as shown in FIG. 12B. The spindle motor 160 preferably drives the rotating disk surface 180 through the spindle 170. The hard disk drive may further include a second rotating disk surface 182, to which a second actuator arm 52 may position a second head gimbal assembly 62. An embedded printed circuit board 2000 is used to control the positioning of the read-write head 10 by the micro-actuator assembly 200, as well as the coarse positioning through the interactions with the voice coil 114 and the actuator arm 50.

Figure 15A:
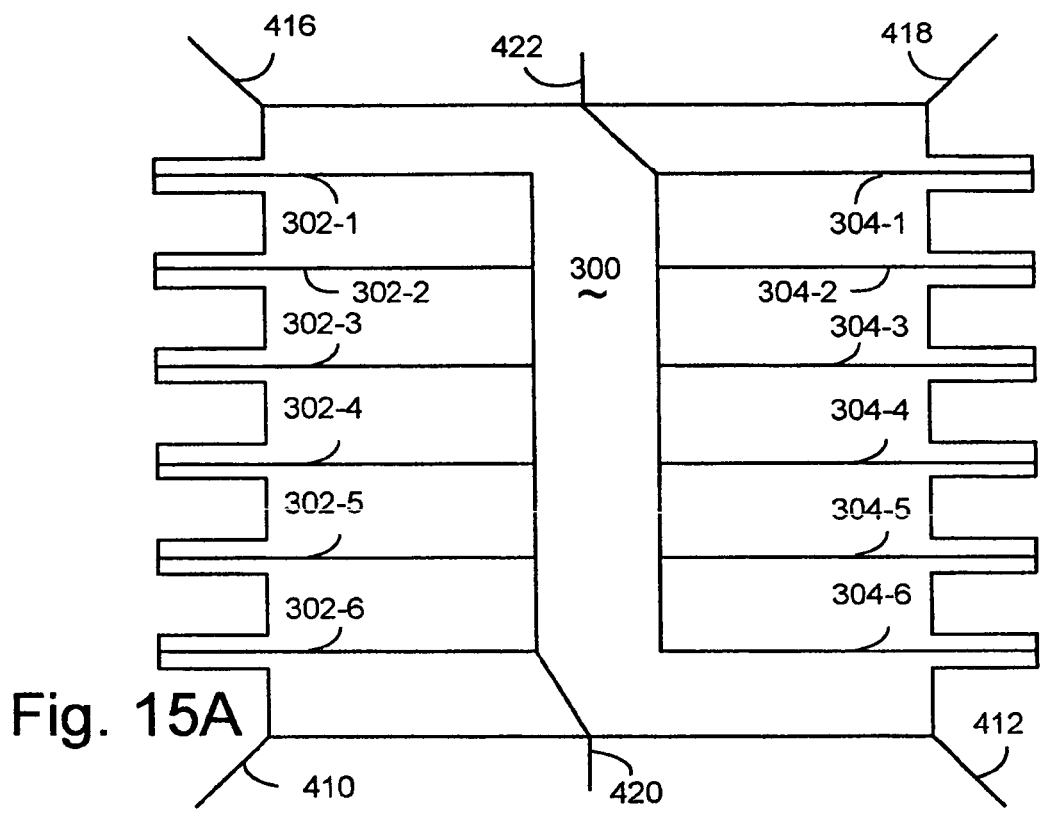
FIG. 15A shows the pitch top spring electrically coupled with the second finger array and the pitch bottom spring electrically coupled with the first finger array.

FIG. 15A shows the pitch top spring 422 electrically coupled with the second finger array 304-1-N2 and the pitch bottom spring 420 electrically coupled with the first finger array 302-1-N1. The invention also includes the pitch bottom spring 420 electrically coupled with the second finger array 304-1-N2 and the pitch top spring 422 electrically coupled with the first finger array 302-1-N1.

Figure 15B:
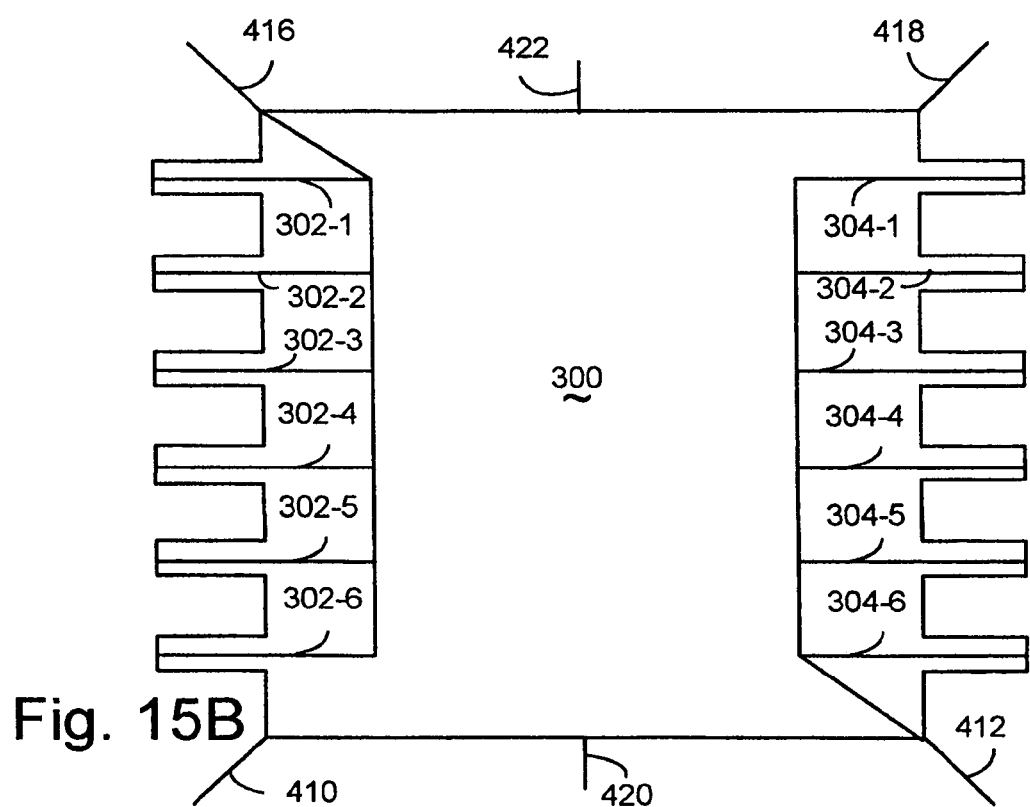
FIG. 15B shows the first flexure top spring electrically coupled with the first finger array and the second flexure bottom spring electrically coupled with the second finger array.

FIG. 15B shows the first flexure top spring 416 electrically coupled with the first finger array 302-1-N1 and the second flexure bottom spring 412 electrically coupled with the second finger array 304-1-N2. The invention also includes the first flexure bottom spring 410 electrically coupled with the first finger array 302-1-N1 and the second flexure top spring 418 electrically coupled with the second finger array 304-1-N2.

The embodiments shown in FIGS. 15A and 15B may be particularly useful in versions of the micro-actuator assembly 200, which do not include a second micro-actuator 520.

FIG. 16 shows an example of the electrical interactions within the hard disk drive 1000. These interactions are between the embedded printed circuit board 2000 of FIG. 14, the components of the voice coil actuator 118, and the micro-actuator assembly 200, which position and access the read-write head 10 over a rotating disk surface 180 as in FIG. 12B. The embedded printed circuit board 2000 is shown preferably including at least one computer 2100, at least one channel interface 2140, at least one micro-actuator interface 2010, a servo-controller 2030 and a voice coil driver 2250. Overall operation of the hard disk drive 1000 is typically directed by the program system 2128. The program system 2128 includes program steps residing in a memory 2120. The memory 2120 is accessibly coupled 2122 to the computer 2100.

In FIG. 16, the computer 2100 is first-interactively coupled 2142 with the channel interface 2140. The computer 2100 is second-interactively coupled 2032 with the servo-controller 2030. Typically, the channel interface 2140 provides at least one position feedback signal 2034 to the servo-controller 2030. The position feedback signal 2034 may preferably include a Position Error Signal. The position feedback signal 2034 is preferably used in the dynamic control system formed by the computer 2100, the servo-controller 2030, the voice coil actuator 118 and the micro-actuator assembly 200 to move the slider 100.

More specifically, the fine motion control provided by the micro-actuator assembly 200 may preferably position the slider 100 over a small number of neighboring tracks near a specific track. By way of example, the small number of neighboring tracks may number less than twenty. The small number of neighboring tracks may further number less than ten. The small number of neighboring tracks may preferably number about five.

In FIG. 16, there may be a first conductive trace in the micro-actuator control signal bundle 2310 in the flexure 80. The micro-actuator control signal bundle 2310 may further includes a second conductive trace. The flex circuitry 2200 may preferably include a read-write preamplifier 2222 coupling with the read differential signal pair R+− and the write differential signal pair W+−. The read and write differential signal pairs electrically couple with the read-write head 10 within the slider 100. A flex connector 2226 may preferably couple to the printed circuit board connector 2230. The connectors 2230 and 2226 provide micro-actuator controls and preamplifier signal interactions 2150 between the read-write preamplifier 2222 and the channel interface 2140. The micro-actuator interface 2010 provides the raw micro-actuator drive signal bundle 2014 to the printed circuit board connector 2230.

In certain preferred embodiments, there may be more than one flexure. In certain further preferred embodiments, the micro-actuator control signal bundles may each conduct through a shared signal bundle. The second flexure may include the second micro-actuator control signal bundle conducting the shared signal bundle. The third flexure may include the third micro-actuator control signal bundle conducting the shared signal bundle. The fourth flexure may include the fourth micro-actuator control signal bundle conducting the shared signal bundle.

In FIG. 16, the computer 2100 preferably directs the channel interface 2140 and the servo-controller 2030. The servo-controller 2030 interacts with the computer 2100 using the second-interactive coupling 2032. The servo-controller 2030 may preferably include a servo-computer. As used herein a computer will include, but is not limited to, an instruction processor. The instruction processor includes at least one instruction processing element and at least one data processing element, each data processing element controlled by at least one instruction processing element. A computer may also include, but is not limited to, at least one finite state machine, at least one inference engine and/or at least one neural network.

The micro-actuator assembly 200 is coupled to the head gimbal assembly 60 in the following manner. The central movable section 300 is coupled with the flexure 80 by the first flexure spring pair 410 and 416 and by the second flexure spring pair 412 and 418. The central movable section 300 is also coupled through the pitch spring pair 420-422 to the head gimbal assembly 60, by the flexure 80 and/or the load beam 90. The first stator 230 is coupled to the head gimbal assembly 60 by the first pivot spring pair 402 and 408, which may further couple to the flexure 80 and/or the load beam 90. The second stator 250 is coupled by the second pivot spring pair 400 and 406 to the head gimbal assembly 60, by the flexure 80 and/or the load beam YU.

The read-write head 10 uses the read differential signal pair R+− and the write differential signal pair W+− to communicate between the hard disk drive 1000 and the rotating disk surface 180 as shown in FIG. 16. The read differential signal pair R+− is electrically conducted through the read-differential signal pair path 430-432 across the central movable section 300. The write differential signal pair W+− is electrically conducted through the write-differential signal pair path 436-438 across the central movable section 300. Once across the central movable section 300 they are conducted to the read-write preamplifier 2222, located on the flex circuitry 2200. The read-write preamplifier 2222 supports preamplifier signal interactions 2150 across the connectors 2230 and 2226 to the channel interface 2140. The channel interface 2140 which is first-interactively coupled 2142 to the computer 2100 is used to read and write data to the rotating disk surface 180.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A micro-actuator assembly for coupling a slider included a hard disk drive, comprising:
   a first micro-actuator further comprising
      a first pivot spring pair coupling to a first stator;
      a second pivot spring pair coupling to a second stator;
      a first flexure spring pair and a second flexure spring pair coupling to a central movable section;
      a pitch spring pair coupling to said central movable section;
   wherein said central movable section includes a read-differential signal pair path and a write-differential signal pair path; wherein said read-differential signal pair path is used to provide a read differential signal pair coupling to said slider, and said write-differential signal pair path is used to provide a write differential signal coupling to said slider.

2. The apparatus of claim 1, wherein said first flexure spring pair and said second flexure spring pair collectively couple to said read-differential signal pair path and said write-differential signal pair path.

3. The apparatus of claim 2,
   wherein said first flexure spring pair and said second flexure spring pair collectively couple further comprises:
   said first flexure spring pair couples to said read-differential signal pair path; and
   said second flexure spring pair couples to said write-differential signal pair path.

4. The apparatus of claim 2, wherein said first flexure spring pair and said second flexure spring pair and said pivot spring pair collectively couple to said read-differential signal pair path and said write-differential signal pair path.

5. The apparatus of claim 4, wherein said pitch top spring, said first flexure spring pair and said second flexure top spring collectively coupling to said read-differential signal pair path and said write-differential signal pair path.

6. The apparatus of claim 4, wherein said pitch spring pair, said first flexure bottom spring and said second flexure top spring collectively coupling to said read-differential signal pair path and said write-differential signal pair path.

7. The apparatus of claim 1, wherein a first potential difference provides a first electrostatic power between said first stator and a first finger array included in said central movable section to urge said central movable section to move relative to said first stator; and
   wherein a second potential difference provides a second electrostatic power between said second stator and a second finger array included in said central movable section to urge said central movable section to move relative to said second stator.

8. The apparatus of claim 1, wherein said first micro-actuator acts as a lateral comb drive.

9. The apparatus of claim 1, wherein said first micro-actuator acts as a transverse comb drive.

10. The apparatus of claim 1, further comprising a second micro-actuator including a third stator and a fourth stator electrostatically interacting with said central movable section.

11. The apparatus of claim 10, wherein said second micro-actuator acts as a vertical comb drive.

12. The apparatus of claim 11, wherein said second micro-actuator acts as a torsional drive.

13. The apparatus of claim 11, wherein said second micro-actuator acts as a flying height sensor.

14. A head gimbal assembly including said micro-actuator assembly of claim 1 coupled with said slider, further comprising
   said read-differential signal pair path coupling with said read differential signal pair; and
   said write-differential signal pair path coupling with said write differential signal pair.

15. An actuator arm including said head gimbal assembly of claim 14.

16. Said actuator arm of claim 15, further including a second of said head gimbal assembly.

17. An actuator assembly including said actuator arm of claim 15.

18. Said actuator assembly of claim 17, further including a second of said actuator arm.

19. A voice coil actuator including said actuator assembly of claim 17.

20. Said hard disk including said voice coil actuator of claim 19.

* * * * *